US005219636A

United States Patent [19]

Golz

[11] Patent Number: 5,219,636

[45] Date of Patent: Jun. 15, 1993

[54] CUT AND ABRASION RESISTANT WEBBING

[75] Inventor: Robert E. Golz, Swansea, Mass.

[73] Assignee: Murdock Webbing Company, Inc., Central Falls, R.I.

[21] Appl. No.: 687,836

[22] Filed: Apr. 19, 1991

[51] Int. Cl.[5] ...................... B32B 23/02; D04H 1/04; D02G 3/00; B66C 1/12

[52] U.S. Cl. .................................... 428/193; 428/245; 428/259; 428/296; 428/373; 139/411; 294/74

[58] Field of Search ............... 428/225, 236, 245, 259, 428/190, 193, 57, 192, 172, 373, 296; 139/411; 294/74

[56] References Cited

U.S. PATENT DOCUMENTS 2,659,958 11/1953 Johnson .............................. 428/190
3,526,565 9/1970 Walter ................................ 428/193
3,571,814 3/1971 Miller ................................. 428/193
3,632,383 7/1972 Dominick ............................ 428/193
4,052,095 10/1977 Johnson ............................. 428/172
4,501,782 2/1985 Weatherly et al. .................. 428/57
4,522,203 6/1985 Mays .................................. 428/212
4,600,626 7/1986 Ogata ................................. 428/193
4,856,837 8/1989 Hammersla, Jr. ..................... 294/74
5,014,755 5/1991 Bompard et al. ................... 428/373
5,087,327 2/1992 Hood .................................. 428/255

*Primary Examiner*—Jenna L. Davis
*Assistant Examiner*—Terrel Morris
*Attorney, Agent, or Firm*—Salter, Michaelson & Benson

[57] ABSTRACT

Sling or tie-down webbing in the form of a strap whose edges are provided with protective warp yarn structure made up of bicomponent fibers that include a polyester core with a sheath of a polymer with a lower melting point than the polyester, which webbing has been subjected to a heat treatment sufficient to cause melting of said sheath, but not of the core.

6 Claims, 2 Drawing Sheets

CUT AND ABRASION RESISTANT WEBBING

BACKGROUND OF THE INVENTION

In the movement of heavy materials, it is common practice to use a crane or hoist whose downwardly-extending cable is provided with a hook, the hook being connected to the load by one or more flexible slings. A sling of this type usually consists of an elongated webbing having a soft eye at each end for engagement with the horn of the hook. The bight of the sling passes under the load and transfers the weight from the load to the hook.

Because the load is often a massive article with sharp edges, such as steel I-beams and the like, the sling can be and frequently is subjected to an abrasive action. When excessive wear takes place, it is usually at the edge of the sling and this can lead to breakage of the sling. Because the material being lifted is not only heavy but also awkward in shape, the possibility of accidental breakage of the supporting sling cannot be tolerated. The appearance of the slightest wear on the sling leads, therefore, to its being discarded, which is an expensive action. In addition, separation or weakening of the sling can take place even before visible wear takes place, because it is sometimes loaded to over its safe working load.

In addition, webbing of the type above described is often used to tie down heavy cargo, where it is desired to secure the cargo against movement. Such tie-down webbing is also subjected to abrasion and cutting at its edges, and hence the same problems that exist with cargo slings also exist with tie-down webbing.

Because wear, i.e., abrasion or cutting, seems to take place most readily on the edges of the webbing, attempts have been made in the past to increase the resistance to wear at that part of the sling. Various methods for increasing the wear and cut resistance of the edges of fabric strips have been developed, as shown in the Johnson U.S. Pat. No. 2,659,958 (Fourdrinier wire having reinforced coated marginal portions), in the Walter U.S. Pat. No. 3,526,565 (treated warp yarn made into sheet, then heated to fuse and form a web), in the Miller U.S. Pat. No. 3,571,814 (bead of plastic material along the strip), in the Dominick U.S Pat. No. 3,632,383 (application of a heat-solidifiable composition to the edge), and in the Weatherly et al U.S. Pat. No. 4,501,782 (bonding webs by use of ultrasonic energy). The Johnson U.S Pat. No. 4,052,095 shows a sling whose surface is protected by a lamina of an elastomeric material. The Ayase U.S. Pat. No. 4,600,626 shows an automobile seat belt whose resistance to lateral flexure is increased by the use of stiff weft yarns. The Hammersla U.S. Pat. No. 4,856,837 shows a cargo sling that is provided with protective warp yarns consisting of a vinyl sheath on a polyester core. Unfortunately, none of these prior art structures, with the possible exception of HAMMERSLA, gives adequate protection against abrasion to the edge of the strip where it is needed. The degree of resistance to cutting and abrasion is determined in those structures by the material from which the protective yarns are made. These and other difficulties experienced with the prior art devices have been obviated in a novel manner by the present invention.

It is, therefore, an outstanding object of the invention to provide a sling whose edges have extraordinary resistance to abrasion and cutting.

Another object of this invention is the provision of a sling for use in material handling, which sling has excellent strength and toughness.

A further object of the present invention is the provision of a sling which is simple and rugged in construction, which can be easily manufactured from readily obtainable materials, and which is capable of a long life of useful service with a minimum of maintenance.

A still further object of the invention is the provision of a method of treating a webbing to give it maximum abrasive resistance, particularly at the longitudinal edges of the webbing.

It is a further object of the invention to provide a synthetic fiber system to increase the resistance of an article to damage by contact with sharp edged articles.

Another object of the invention is the provision of an edge-strengthening treatment which can be easily carried out during conventional manufacturing procedures.

With these and other objects in view, as will be apparent to those skilled in the art, the invention resides in the combination of parts set forth in the specification and covered by the claims appended hereto.

SUMMARY OF THE INVENTION

In general, the present invention has to do with a sling which has an elongated main body made up of warp yarns of a synthetic fiber, which body is covered with a ply using woven polymer yarns having longitudinal warp yarns and lateral weft yarns. Protective warp yarns are arranged along the edges of the main body, said yarns being formed of a bicomponent fiber consisting of multiple filaments which each have a core and an outer sheath with the latter melting at a temperature lower than the core. Specifically, the bicomponent fiber has a polyester core which melts at around 489 degrees F. and has a sheath selected from a group consisting of nylon-6, polypropylene, or polyethylene, or any other fiber having a lower melting point.

In carrying out the objectives of my invention, the protective yarns are subjected to a temperature treatment that is sufficient to melt the sheath component, but not the core, the result being that the fused sheath imparts improved resistance to wear to the strap edges. The bicomponent fiber has substantially the same modulus of elasticity as the synthetic fiber in the main body so as not to inhibit elongation of the strap. The edges, after the temperature treatment, may be subjected to a cracking operation to increase their flexibility, while not decreasing their resistance to wear.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
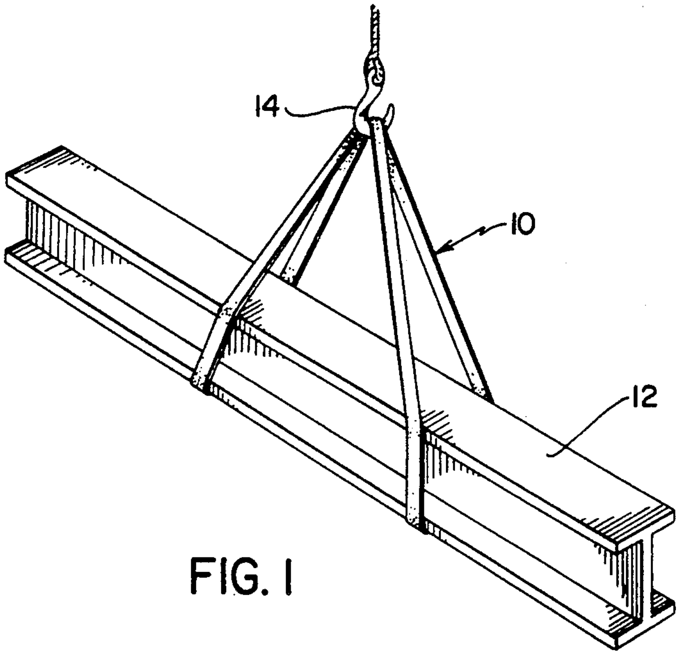
FIG. 1 is a perspective view of a sling constructed in accordance with the principles of the present invention and shown in use in lifting a load.
Figure 7:
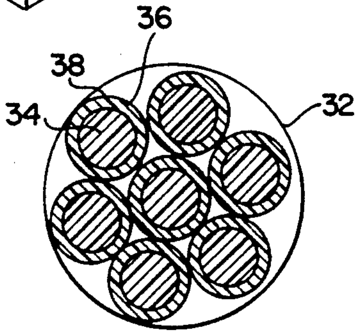
FIG. 7 is a cross-sectional view, on an enlarged scale, of the bicomponet yarn that forms a part of the invention.

Referring first to FIG. 1, which best shows the general features of the invention, the sling, indicated generally by the reference numeral 10, is shown in use to hold a load 12. The load is shown as an I-beam, which is a typical load having sharp edges that can easily damage the edges of a sling. The sling extends upwardly from the load to a hoisting hook 14.

Figure 2:
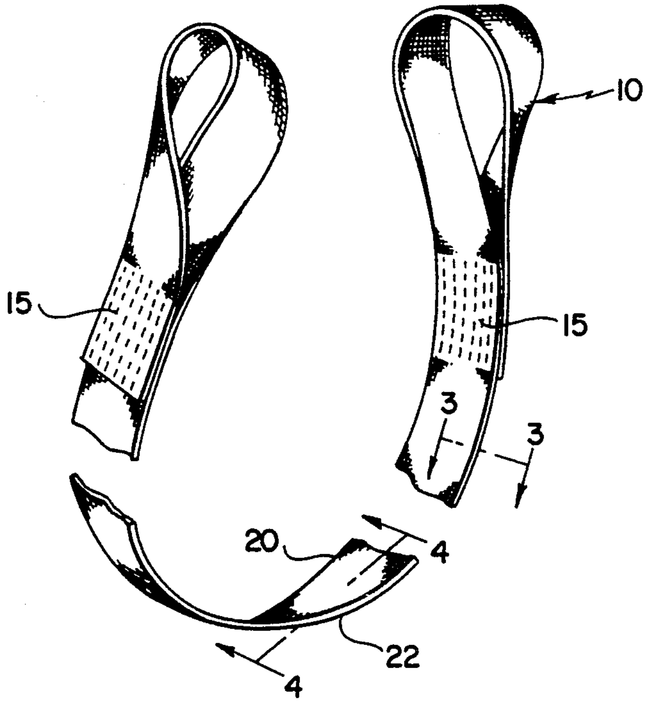
FIG. 2 is a perspective view, somewhat enlarged, of the invention, showing its general structure.

In FIG. 2, it can be seen that the sling 10 is an elongated strap with eyes formed at their ends. The eyes are formed by folding the strap back on itself and stitching the free end to the bight of the strap, as at 15.

Figure 3:
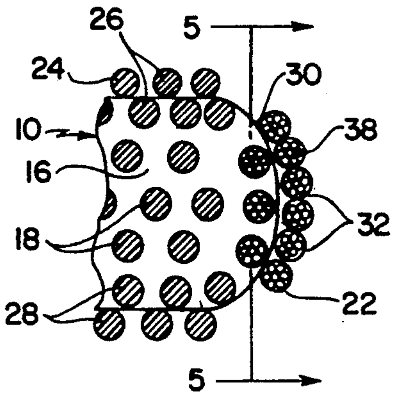
FIG. 3 is a transverse sectional view of a portion of the sling, taken on the line 3—3 of FIG. 2.
Figure 4:
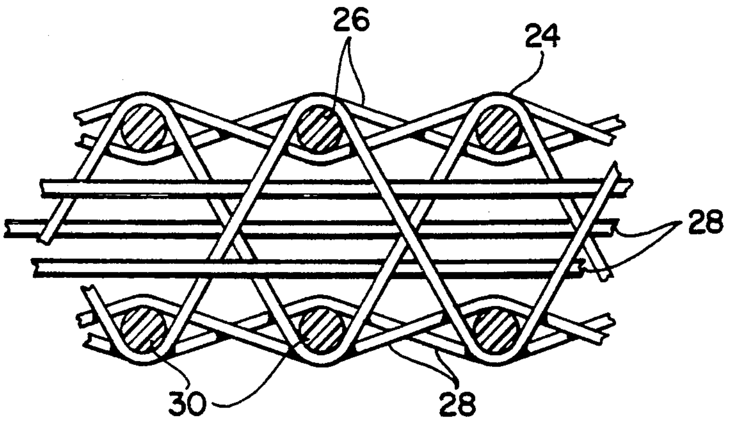
FIG. 4 is a sectional view of the sling, taken on the line 4—4 of FIG. 2.
Figure 5:
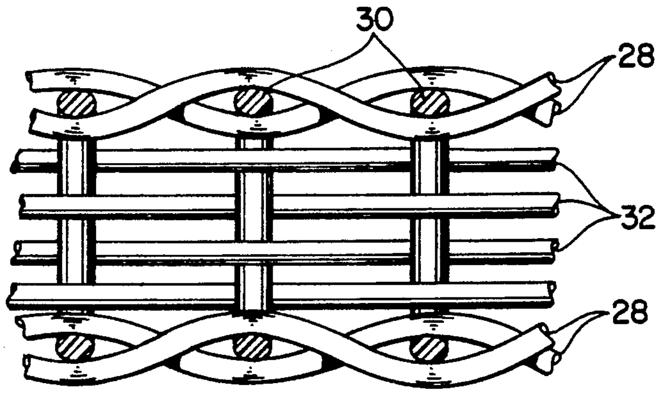
FIG. 5 is a sectional view of the sling, taken on the line 5—5 of FIG. 3.

In FIG. 3, it can be seen that the sling 10 is provided with a main body 16 made up of warp yarns 18 formed of any suitable fiber and packed to form a rectangular cross-section having narrow end edges 20, 22 (see FIG. 2). The main body is surrounded by an outer ply 24 consisting of woven yarns 26. The ply is formed with longitudinal warp yarns 28 and transverse or lateral weft yarns 30. Protective warp yarns 32 are arranged along the end edges of the main body. Each protective yarn consists of bicomponent multiple filaments 38, each having a core and an outer sheath, the latter having a lower melting temperature than the core.

Specifically, each protective yarn consists of bicomponent multiple filaments 38 which have a polyester core 34 which melts at a temperature of around 489 degrees F. and a sheath 36 that is formed of a polymer selected from the group consisting of nylon-6, polypropylene, or polyethylene, or any other fiber having a lower melting point than the core.

Once the sling has been constructed in the manner described above, it is subjected to a temperature treatment that is sufficient to melt the sheath 36, but not the core 34. As a result of this melting or fusing operation, the molecular characteristics of yarn 32, and particularly sheath 36, are somewhat altered, resulting in an unexpectedly high resistance to abrasion. In addition, the melting operation results in some degree of fusion between adjacent protective yarns 32, resulting in a web-like structure that further enhances resistance to abrasion and cutting. The temperature treatment can be applied locally to edges 20 22, or else the entire strap can be exposed to the heat source.

In a preferred version of the invention, the bicomponent fiber has a sheath of nylon-6 that is treated for 4 minutes at about 435 degrees F. Another version of the invention uses a sheath of polypropylene that is treated for 4 minutes at around 375 degrees F. A still further version of the invention uses a sheath of polyethylene which is treated for 4 minutes at a temperature of around 300 degrees F. In all cases, the bicomponent fiber has substantially the same modulus of elasticity as the synthetic fiber of the yarns 18 of the main body, even after the fusing operation. In the preferred embodiment, the end edges 20, 22 are subjected, after the temperature treatment, to a cracking operation to increase their flexibility, while not decreasing their resistance to abrasion and to cutting by sharp edges on the load. In all of the above cases, the degree of heat is sufficient to melt or fuse the sheath 36, but not core 34.

The operation and advantages of the invention will now be readily understood in view of the above description. When the sling 10 is used in the manner shown in FIG. 1, it is clear that certain types of load 12 cause extreme wear to the surfaces of the sling. It is clear, however, that the greatest destructive pressure and stress takes place at the edges 20, 22 of the sling. In the present case, as the hoist hook rises and the forces between the sling and the load take place, the reinforcing and protective yarns 32 that extend longitudinally along the edge surfaces can receive the stresses without being cut or even abraded. The tough nature of the structure formed by these yarns serves to completely protect the sling from such damaging treatment.

It can be seen, then, that the present invention has the advantage that the location of the special bi-component fibers (that have been exposed to temperature treatment) protect the most vulnerable portion of the sling. Additionally, this protection can be provided inexpensively during the manufacture of the webbing.

Figure 6:
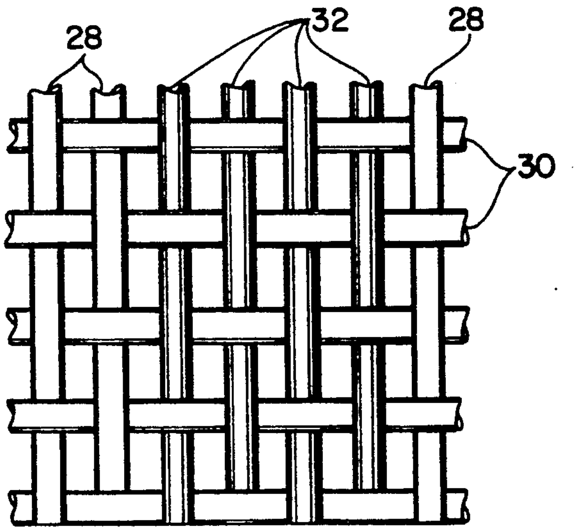
FIG. 6 is a plan view showing the protective bicomponent yarn located in the center of the strap or webbing.

Although the edges 20, 22 represent the most useful location for the protective yarns 32, in some cases it may be desired to also strengthen the center portion of the webbing or strap by providing protective yarn at such locations, as illustrated in FIG. 6.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An elongated webbing having opposed longitudinal edges formed from warp and weft yarns woven together, at least some of said warp yarns located adjacent the edges of said webbing being specially formed so as to exhibit increased resistance to abrasion and cutting, said specially formed yarns each comprising a plurality of individual filaments each of which comprises a core and an outer sheath, the melting point of the sheath being lower than that of the its core.

2. The webbing as recited in claim 1 wherein said filaments each have a polyester core which melts at around 489 degrees F. and a sheath selected from the group consisting of nylon-6, polypropylene, or polyethylene, or any other material having a lower melting point.

3. The webbing as recited in claim 1 wherein said specially formed yarns are warp yarns located at the longitudinal edges of said webbing.

4. The webbing as recited in claim 1 wherein said specially formed yarns are warp yarns located intermediate the longitudinal edges of said webbing.

5. The webbing of claim 1 wherein the specially formed yarns have been subjected to a temperature treatment sufficient to melt said sheaths, but not said cores.

6. The webbing of claim 1 wherein said heat-treated yarns have at least as great a modulus of elasticity as the yarns in said webbing that have not be specially formed.

* * * * *